US012100339B1

(12) United States Patent
Tsai et al.

(10) Patent No.: US 12,100,339 B1
(45) Date of Patent: Sep. 24, 2024

(54) METHOD OF SCANNING DISPLAY PANEL AND RELATED DISPLAY DRIVER

(71) Applicant: NOVATEK Microelectronics Corp., Hsin-Chu (TW)

(72) Inventors: Yi-Yang Tsai, Hsinchu County (TW); Po-Hsiang Fang, Hsinchu County (TW); Jhih-Siou Cheng, New Taipei (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 18/196,415

(22) Filed: May 11, 2023

(51) Int. Cl.
*G09G 3/32* (2016.01)

(52) U.S. Cl.
CPC ....... *G09G 3/32* (2013.01); *G09G 2310/0202* (2013.01); *G09G 2310/0208* (2013.01); *G09G 2310/0267* (2013.01); *G09G 2310/08* (2013.01)

(58) Field of Classification Search
None
See application file for complete search history.

(56) References Cited

U.S. PATENT DOCUMENTS 6,563,483 B1 * 5/2003 Sakumoto ............ G09G 3/3611 345/98
9,799,277 B1 * 10/2017 Derckx ................ G02B 26/005
9,824,653 B2 * 11/2017 Park ..................... G09G 3/3614
2003/0034946 A1 * 2/2003 Liang ................... G09G 3/2029 345/89
2006/0152464 A1 * 7/2006 Ishii ..................... G09G 3/3648 345/98
2008/0316158 A1 * 12/2008 Chang .................. G09G 3/3648 345/92
2011/0310068 A1 * 12/2011 Nose .................... G09G 3/3629 345/204
2016/0267868 A1 * 9/2016 Choi .................... G09G 3/3266
2016/0335970 A1 * 11/2016 Cheng .................. G09G 3/3648
2016/0351141 A1 * 12/2016 Liu ..................... G06F 3/04184
2017/0270866 A1 * 9/2017 Asano .................. G09G 3/3233
2018/0268770 A1 * 9/2018 Nakanishi ............ G09G 3/3677
2020/0074948 A1 * 3/2020 Morein ................ G09G 3/3674
2022/0108658 A1 * 4/2022 Muto ..................... H04N 23/65

* cited by examiner

*Primary Examiner* — Patrick N Edouard
*Assistant Examiner* — Peijie Shen
(74) *Attorney, Agent, or Firm* — Winston Hsu

(57) ABSTRACT

A method of scanning a display panel having a plurality of rows of pixels includes steps of: generating a first accumulated number; calculating a first scan number according to the first accumulated number; scanning a present row of pixels having the first scan number among the plurality of rows of pixels; accumulating the first accumulated number to generate a second accumulated number; calculating a second scan number according to the second accumulated number; and scanning a next row of pixels having the second scan number among the plurality of rows of pixels after scanning the present row of pixels. Wherein, the plurality of rows of pixels are scanned in a scan order different from a numbering order of the plurality of rows of pixels.

18 Claims, 6 Drawing Sheets

METHOD OF SCANNING DISPLAY PANEL AND RELATED DISPLAY DRIVER

BACKGROUND OF THE INVENTION

1. Field of the Invention

The present invention relates to a method of scanning a display panel, and more particularly, to a non-sequential scan method for a display panel.

2. Description of the Prior Art

In modern light-emitting diode (LED) panels, the LEDs are deployed as a pixel array controlled by multiple scan lines and data lines. As for a common-cathode structure, the anode of each row of LED pixels is coupled to a data line and the cathode of each column of LED pixels is coupled to a scan line. Conversely, as for a common-anode structure, the cathode of each row of LED pixels is coupled to a data line and the anode of each column of LED pixels is coupled to a scan line. In the scan procedure of a LED panel, the scanned LEDs are lit up through driving currents. These driving currents could be controlled by using the pulse width modulation (PWM) technique, where the brightness of grayscale is controlled by setting the turn-on or turn-off ratio of the scanned LEDs.

Using digital mobile phones and cameras to shoot pictures and record videos has become a daily habit of people. The digital mobile phones and cameras are mostly equipped with complementary metal-oxide semiconductor (CMOS) photosensitive elements and apply rolling shutters to capture images, such that the jelly effect becomes unavoidable in dynamic images. The PWM display technique of the LED panels is similar to the rolling shutters where the scanning operations rapidly move from up to down. Therefore, there may be unwanted black lines or dark lines generated in a video of the LED screen shot by a digital mobile phone or camera, and this degrades the video quality.

SUMMARY OF THE INVENTION

It is therefore an objective of the present invention to provide a novel scan method for a light-emitting diode (LED) panel, where the LED pixels are scanned non-sequentially, so as to solve the abovementioned problems.

An embodiment of the present invention discloses a method of scanning a display panel having a plurality of rows of pixels. The method comprises steps of: generating a first accumulated number; calculating a first scan number according to the first accumulated number; scanning a present row of pixels having the first scan number among the plurality of rows of pixels; accumulating the first accumulated number to generate a second accumulated number; calculating a second scan number according to the second accumulated number; and scanning a next row of pixels having the second scan number among the plurality of rows of pixels after scanning the present row of pixels. Wherein, the plurality of rows of pixels are scanned in a scan order different from a numbering order of the plurality of rows of pixels.

Another embodiment of the present invention discloses a display driver for scanning a display panel having a plurality of rows of pixels. The display driver comprises a control circuit and a power switch circuit. The control circuit generates a first accumulated number, calculates a first scan number according to the first accumulated number, accumulates the first accumulated number to generate a second accumulated number, and calculates a second scan number according to the second accumulated number. The power switch circuit scans a present row of pixels having the first scan number among the plurality of rows of pixels, and scans a next row of pixels having the second scan number among the plurality of rows of pixels after the present row of pixels are scanned. Wherein, the plurality of rows of pixels are scanned in a scan order different from a numbering order of the plurality of rows of pixels.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
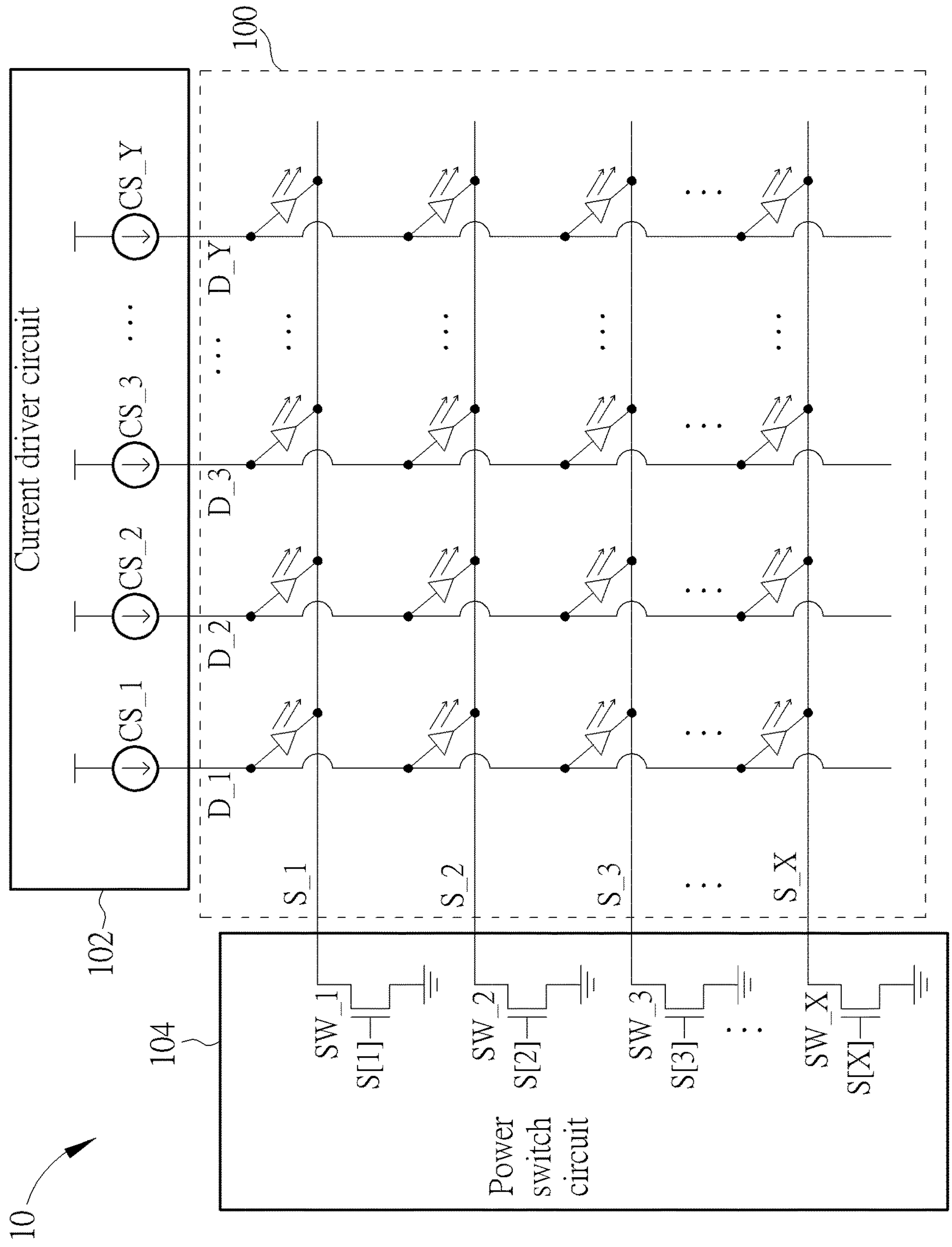
FIG. 1 is a schematic diagram of a display system according to an embodiment of the present invention.

FIG. 1 is a schematic diagram of a display system 10 according to an embodiment of the present invention. The display system 10 may be a light-emitting diode (LED) display system, which includes a display panel 100, a current driver circuit 102 and a power switch circuit 104. The display panel 100 may include a plurality of LED pixels arranged as an array and controlled by data lines D_1-D_Y and scan lines S_1-S_X. As for each LED, the anode is coupled to one of the data lines D_1-D_Y and the cathode is coupled to one of the scan lines S_1-S_X, to realize a common-cathode structure. In another embodiment, the anode of all or several LEDs may be coupled to the scan lines and the cathode of all or several LEDs may be coupled to the data lines, to realize a common-anode structure or a hybrid structure with coexistence of common-anode pixels and common-cathode pixels. The LED pixels of the display panel 100 may be scanned by the power switch circuit 104 row by row, and the scanned LEDs may emit light by receiving currents from the current driver circuit 102. The scanned LED pixels may emit light based on the currents flowing through the corresponding LEDs.

The current driver circuit 102 may include multiple current sources CS_1-CS_Y, each coupled to a column of LED pixels through data lines D_1-D_Y, respectively, where Y is a positive integer indicating the column count of the display panel 100. Each of the current sources CS_1-CS_Y may be coupled to the LED pixels through a switch (not illustrated), which may be turned on or off for determining the brightness of each pixel based on pulse width modulation (PWM) control. For example, the larger turn-on ratio will lead to higher brightness. Note that the arrangement of the current sources CS_1-CS_Y shown in FIG. 1 is merely an example. In another embodiment, each current source may be coupled to several columns of LED pixels through a multiplexer, to output driving currents to different columns of pixels time-divisionally. In addition, the current driver circuit 102 may also include a pre-discharge circuit for accelerating the discharging operations of the data lines and thereby improving the display performance. The pre-discharge circuit is omitted in FIG. 1 without influencing the illustrations of the present embodiment.

The power switch circuit 104 may include multiple scan switches SW_1-SW_X, each coupled to a row of LED pixels through scan lines S_1-S_X, respectively, where X is a positive integer indicating the row count of the display panel 100. Each of the scan switches SW_1-SW_X may be implemented with one or more transistors, which may be turned on or off by receiving scan control signals S[1]-S[X], to control the scan operations of the LED pixels. Note that the arrangement of the power switch circuit 104 shown in FIG. 1 is merely an example. In another embodiment, each scan line S_1-S_X may further be coupled to a pre-charge circuit, for charging the parasitic capacitors on the scan lines S_1-S_X to avoid image sticking and thereby improving the display performance. The pre-charge circuit is omitted in FIG. 1 without influencing the illustrations of the present embodiment.

In a conventional scan operation, as for each image frame, the LED pixels on the display panel 100 may be scanned in a sequential order; that is, scanned from up to down with an order of S_1, S_2 . . . , S_X. Therefore, the LED pixels may emit light sequentially from up to down. As mentioned above, this sequential scan method suffers from the jelly effect in the picture of the display panel 100 shot by a digital mobile phone or camera. In order to solve this problem, the present invention provides a novel scan method to scan the LED pixels in a non-sequential manner; that is, the scan order of the pixel rows on the display panel 100 may be scrambled.

Figure 2:
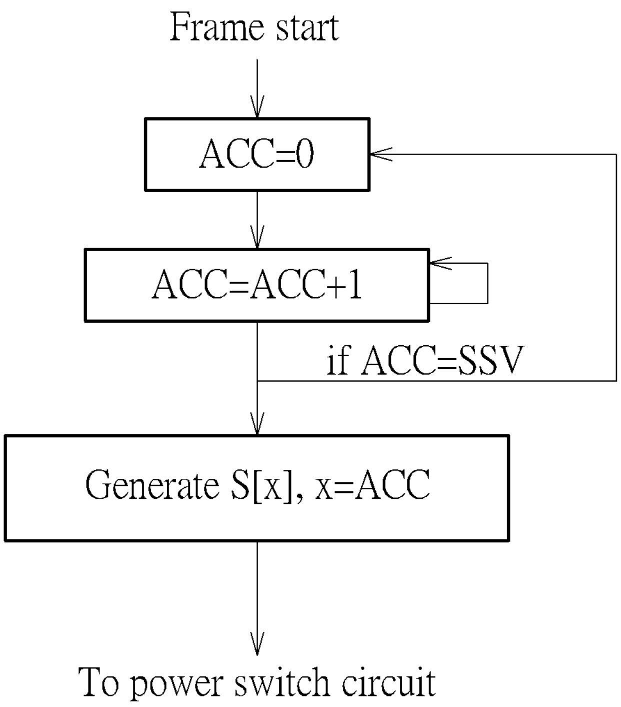
FIG. 2 is a flowchart of a general algorithm for generating scan control signals for the power switch circuit.

FIG. 2 is a flowchart of a general algorithm for generating scan control signals S[x] for the power switch circuit, where x may be any integer from 1 to X, and the scan control signal S[x] turns on the scan switch SW_x coupled to the LED pixels in the x-th row, which means that the x-th row (namely, row number x) is scanned. First, a frame start signal may be received, which indicates the start of displaying an image frame. An accumulated number ACC is applied to indicate which row of LED pixels is scanned, and the value of ACC equals 0 in the beginning. Subsequently, the accumulated number ACC is added by 1, to generate the corresponding scan control signal S[x] with x=ACC. The scan control signal S[x] may be output to the power switch circuit such as the power switch circuit 104 shown in FIG. 1, to turn on the scan switch SW_x and scan the x-th row of LED pixels. Since the accumulated number ACC is added by 1 in each scan cycle, the scan switches SW_1-SW-X may be turned on sequentially, to scan the LED pixels from up to down.

Figure 3:
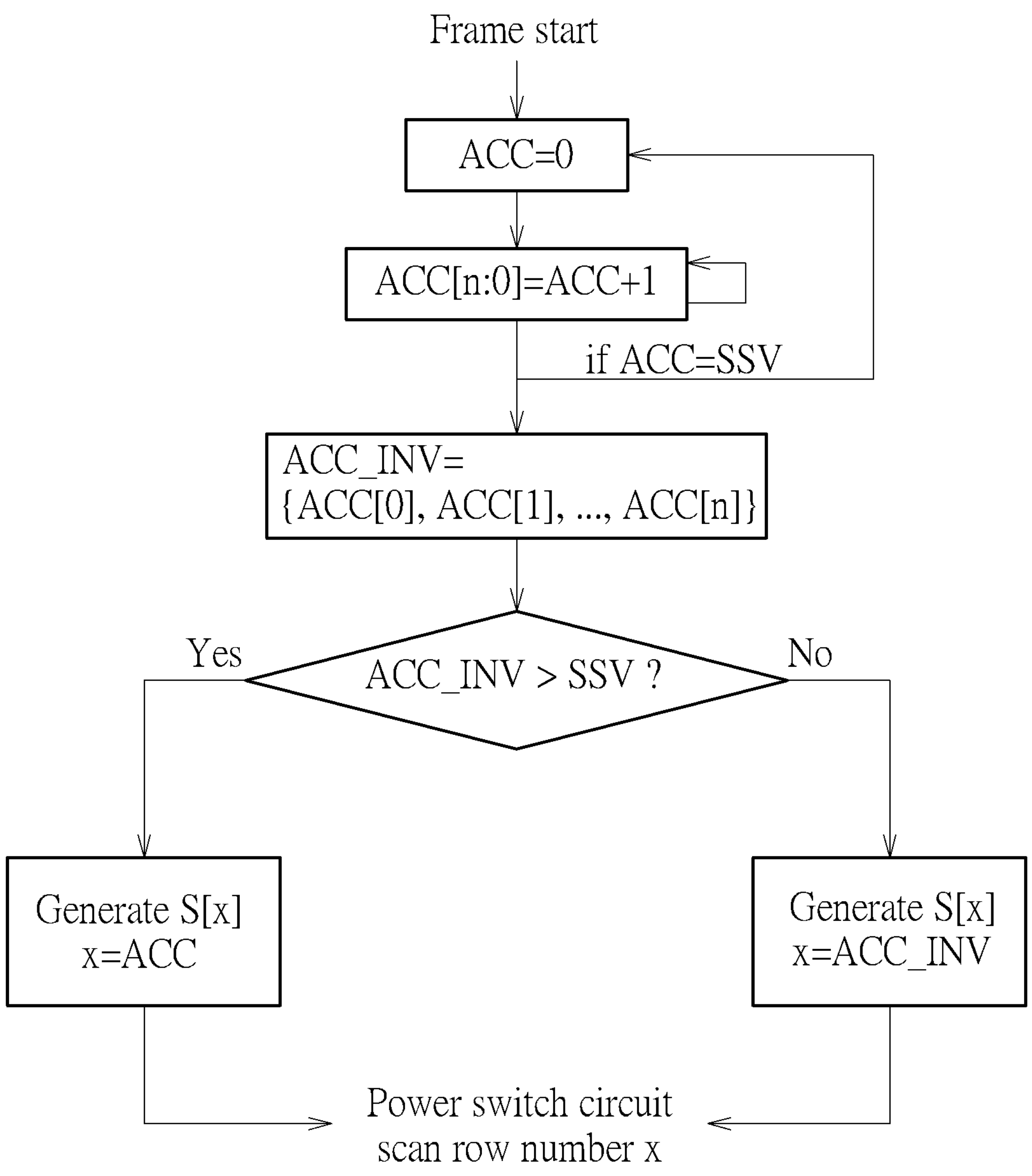
FIG. 3 is a flowchart of an algorithm for generating scan control signals for the power switch circuit according to an embodiment of the present invention.

FIG. 3 is a flowchart of an algorithm for generating scan control signals S[x] for the power switch circuit according to an embodiment of the present invention. Similarly, the scan control signal S[x] turns on the scan switch SW_x coupled to the LED pixels in the x-th row, which means that the x-th row is scanned. The rows of LED pixels may be numbered in an ascending order from up to down, but the scan order of the rows of LED pixels may be different from their numbering order.

The accumulated number ACC may be applied to calculate and determine which row of LED pixels is scanned, and the value of ACC is started from 0 and accumulated in each scan cycle. In an embodiment, the accumulated number ACC may be added by 1 in each scan cycle, until the accumulated number ACC reaches a scan setting value SSV. The scan setting value SSV may be set to be equal to the total row count of the display panel. If the accumulated number ACC equals the scan setting value SSV, the accumulated number ACC may then return to 0, which means that all the LED pixels on the display panel are completely scanned in this image frame. The accumulated number ACC may be reset to 0 and then wait for a new frame start signal which starts the scan of the next image frame.

Subsequently, the accumulated number ACC may be inverted to generate an inverted number ACC_INV. The inversion operation is to invert the bit values of the accumulated number ACC. In an embodiment, the accumulated number ACC may be an (n+1)-bit digital signal ACC[n:0], where the bit values of ACC[n:0] are exchanged inversely to generate the inverted number ACC_INV. For example, the values of the most significant bit (MSB) ACC[n] and the least significant bit (LSB) ACC[0] are exchanged, the values of the second MSB ACC[n−1] and the second LSB ACC[1] are exchanged, the values of the third MSB ACC[n−2] and the third LSB ACC[2] are exchanged, and so on. The inverted number ACC_INV generated after the inversion operation may be represented by {ACC[0], ACC[1], . . . , ACC[n] }.

Note that the inverted number ACC_INV is applied to indicate the row number to be scanned, and thus should not exceed the maximum row number. For example, if there are 768 rows of LED pixels on the display panel, the power switch circuit for the display panel may be controlled by the scan control signals S[1]-S[768], and an inverted number ACC_INV exceeding 768 may not be applicable to generate any of the scan control signals S[1]-S[768]. Therefore, the algorithm further includes a determination step, to determine whether the inverted number ACC_INV is greater than the scan setting value SSV. As mentioned above, the scan setting value SSV may be set to be equal to the total row count of the display panel.

As a result, the inverted number ACC_INV may not be feasible if it exceeds the scan setting value SSV. In an embodiment, if the inverted number ACC_INV is determined to be greater than the scan setting value SSV, the inverted number ACC_INV may be converted back to restore the accumulated number ACC, and the scan control signal S[x] may be generated based on the accumulated number ACC. If the inverted number ACC_INV is determined to be smaller than or equal to the scan setting value SSV, the inverted number ACC_INV may be applied to generate the scan control signal S[x] to be output to the power switch circuit.

Therefore, based on the result of the determination step which indicates whether the inverted number ACC_INV is greater than the scan setting value SSV or not, the scan control signal S[x] may be generated, where x is a scan number indicating which row of LED pixels is to be scanned. In the embodiment as shown in FIG. 1, the scan number x may be any integer from 1 to X. As shown in FIG. 3, the scan number x may be selected from the accumulated number ACC or the inverted number ACC_INV according to the determination result. More specifically, if the inverted number ACC_INV is determined to be greater than the scan setting value SSV, the scan number x may be selected from the accumulated number ACC; that is, x=ACC. If the inverted number ACC_INV is determined to be smaller than or equal to the scan setting value SSV, which means that the inverted number ACC_INV is within the row count, the scan number x may be selected from the inverted number ACC_INV; that is, x=ACC_INV.

Subsequently, the control circuit may provide the value of the scan number x for the power switch circuit or output the scan control signal S[x] to the power switch circuit, and the power switch circuit may scan row number x accordingly, e.g., by turning on the scan switch SW_x for row number x.

Based on the algorithm illustrated in FIG. 3, the LED pixels on the display panel may be scanned non-sequentially. For example, in the present scan cycle, a present row of pixels having a first scan number x1 may be scanned, where the first scan number x1 may be calculated according to a first accumulated number ACC1. In this embodiment, the first scan number x1 may be selected from the first accumulated number ACC1 or a first inverted number ACC_INV1 which is inverted from the first accumulated number ACC1. In the next scan cycle, a next row of pixels having a second scan number x2 may be scanned, where the second scan number x2 may be calculated according to a second accumulated number ACC2. The second accumulated number ACC2 may be generated by accumulating the first accumulated number ACC1, e.g., ACC2=ACC1+1. In this embodiment, the second scan number x2 may be selected from the second accumulated number ACC2 or a second inverted number ACC_INV2 which is inverted from the second accumulated number ACC2. Since the inversion operation may be applied to generate at least one of the first scan number x1 and the second scan number x2, the row having the second scan number x2 may not be adjacent to the row having the first scan number x1.

In this manner, the row having a third scan number x3 may not be adjacent to the row having the second scan number x2, the row having a fourth scan number x4 may not be adjacent to the row having the third scan number x3, and so on. As a result, the scan order will be evenly scattered over the display panel, so as to realize the non-sequential scan operation.

In an exemplary embodiment, the display panel includes 7 rows of pixels, which may be numbered from 1 to 7 in an ascending order from up to down, and controlled by scan control signals S[1]-[7], respectively. The accumulated number ACC may start from 0 and accumulate as being added by 1 in each scan cycle. The inversion operation is then performed on the accumulated number ACC to generate the inverted number ACC_INV. The related operations are summarized into Table 1, as shown below:

TABLE 1

| Scan cycle | ACC (DEC) | ACC (BIN) | ACC_INV (BIN) | ACC_INV (DEC) | Scan No. |
|---|---|---|---|---|---|
| 1 | 1 | 001 | 100 | 4 | 4 |
| 2 | 2 | 010 | 010 | 2 | 2 |
| 3 | 3 | 011 | 110 | 6 | 6 |
| 4 | 4 | 100 | 001 | 1 | 1 |
| 5 | 5 | 101 | 101 | 5 | 5 |
| 6 | 6 | 110 | 011 | 3 | 3 |
| 7 | 7 | 111 | 111 | 7 | 7 |

To facilitate the illustrations of the inversion operation, both the binary value (BIN) and the decimal value (DEC) of the accumulated number ACC and the inverted number ACC_INV are listed, where the inverted number ACC_INV is generated by inversely exchanging the bit values of the accumulated number ACC. Since there are 7 rows of pixels included in the display panel, the scan setting value SSV may be equal to 7. In addition, due to the row count 7, the values of the accumulated number ACC and the inverted number ACC_INV are preferably represented by 3 bits. In this embodiment, none of the inverted numbers ACC_INV is greater than 7, and thus the scan number will always be selected from the inverted number ACC_INV. In such a situation, the pixel rows may be scanned in an order 4, 2, 6, 1, 5, 3 and 7, which seems to be fully scrambled and thus the jelly effect in the picture of the display panel may be avoided.

In another exemplary embodiment, the display panel includes 5 rows of pixels, which may be numbered from 1 to 5 in an ascending order from up to down, and controlled by scan control signals S[1]-S[5], respectively. The accumulated number ACC may start from 0 and accumulate as being added by 1 in each scan cycle. The inversion operation is then performed on the accumulated number ACC to generate the inverted number ACC_INV. The related operations are summarized into Table 2, as shown below:

TABLE 2

| Scan cycle | ACC (DEC) | ACC (BIN) | ACC_INV (BIN) | ACC_INV (DEC) | Scan No. |
|---|---|---|---|---|---|
| 1 | 1 | 001 | 100 | 4 | 4 |
| 2 | 2 | 010 | 010 | 2 | 2 |
| 3 | 3 | 011 | 110 | 6 | 3 |
| 4 | 4 | 100 | 001 | 1 | 1 |
| 5 | 5 | 101 | 101 | 5 | 5 |

Since there are 5 rows of pixels included in the display panel, the scan setting value SSV may be equal to 5. In addition, due to the row count 5, the values of the accumulated number ACC and the inverted number ACC_INV are preferably represented by 3 bits. In this embodiment, in the $3^{rd}$ scan cycle, the inverted number ACC_INV is greater than the scan setting value SSV, and thus the inverted number ACC_INV may be converted to restore the accumulated number ACC, or the scan number may be selected from the accumulated number ACC, 3. The scan numbers in other scan cycles are selected from the inverted number ACC_INV. In such a situation, the pixel rows may be scanned in an order 4, 2, 3, 1 and 5, which seems to be fully scrambled and thus the jelly effect in the picture of the display panel may be avoided.

Figure 4:
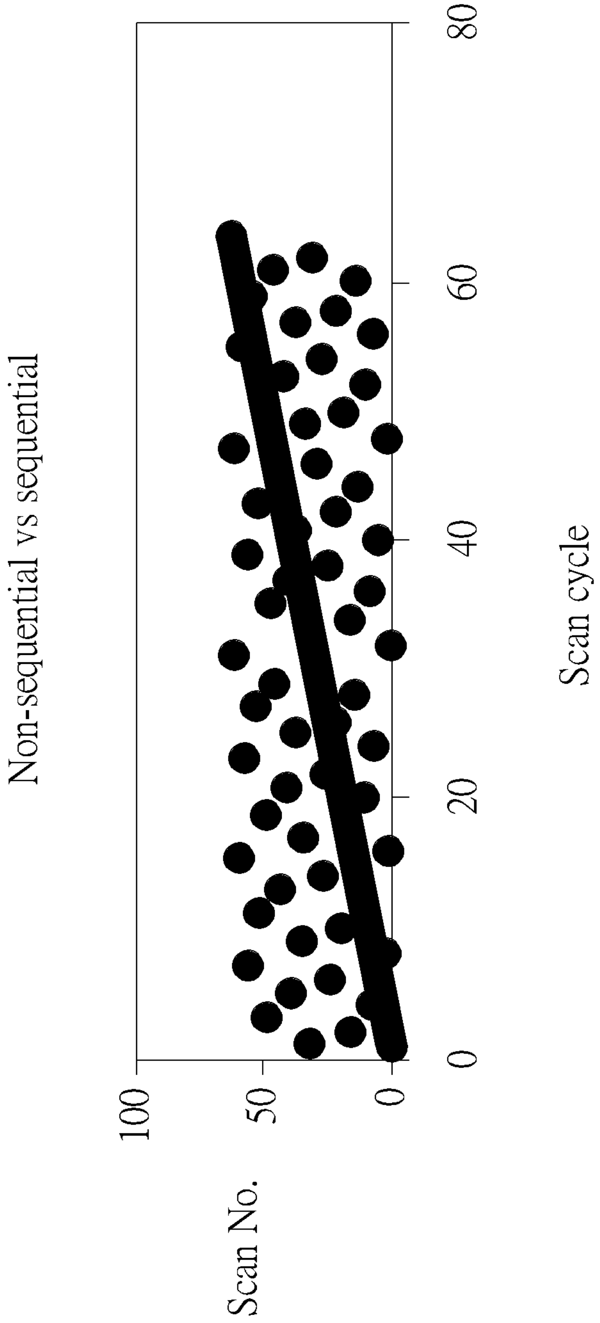
FIG. 4 illustrates the comparison of sequential scan and non-sequential scan.

FIG. 4 illustrates the comparison of sequential scan and non-sequential scan. In this embodiment, the display panel may include 63 rows of pixels, which are scanned row by row in 63 scan cycles in a frame period. The sequential scan is represented by an oblique straight line, where the pixels are scanned from the first row (i.e., the topmost row) to the last row (i.e., the bottommost row) sequentially. The non-sequential scan is represented by multiple dots, where the scan order is determined based on the algorithm provided in FIG. 3 and related descriptions. More specifically, based on the 63 rows of pixels where the scan numbers are represented by 7 bits, the scan order may be calculated and obtained as 32, 16, 48, 8, 40, 24 . . . . As shown in FIG. 4, the dots of the non-sequential scan are evenly spread and scattered over these scan cycles.

Figure 5:
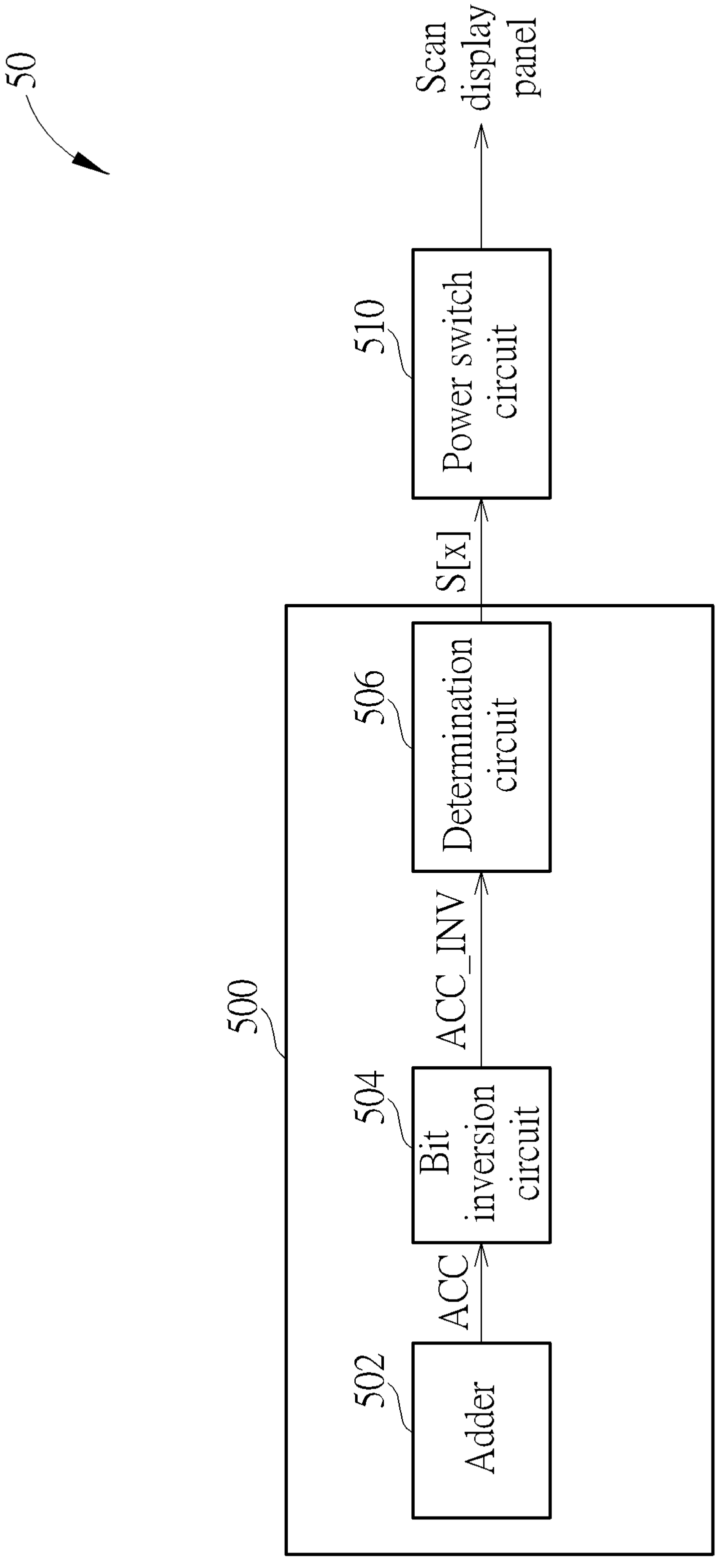
FIG. 5 is a schematic diagram of a display driver according to an embodiment of the present invention.

FIG. 5 is a schematic diagram of a display driver 50 according to an embodiment of the present invention. The display driver 50, which may drive a display panel to show a video, includes a control circuit 500 and a power switch circuit 510. The control circuit 500 may control the non-sequential scan on the display panel. More specifically, the control circuit 500 may output scan control signals S[x], x=1~X, to the power switch circuit 510 in a non-sequential order, allowing the pixel rows on the display panel to be scanned non-sequentially. In an embodiment, the control circuit 500 may calculate and generate a series of non-sequential scan numbers, and apply the scan numbers to generate a series of scan control signals S[x], where x includes a series of non-sequential values from 1 to X. The control circuit 500 may be implemented in a timing controller integrated circuit (IC), but not limited thereto.

The power switch circuit 510 may be the power switch circuit 104 shown in FIG. 1, for controlling the scan operations of the display panel based on the received scan control signals S[x]. The detailed operations of the power switch circuit 510 are described in the above paragraphs associated with FIG. 1, and will not be repeated herein. The power switch circuit 510 may be implemented in a scan driver, which may be included in an IC or deployed at the border of the display panel, but not limited thereto.

As shown in FIG. 5, the control circuit 500 includes an adder 502, a bit inversion circuit 504 and a determination circuit 506, which may be operated to realize the algorithm provided by the present invention. In detail, the adder 502 may add the accumulated number ACC by 1 in each scan cycle, to accumulate the accumulated number ACC. The bit inversion circuit 504 may invert the accumulated number ACC to generate the inverted number ACC_INV in each cycle. The determination circuit 506 may determine whether the inverted number ACC_INV is greater than the scan setting value SSV, and thereby determine whether to restore the accumulated number and/or to select the scan number x from the accumulated number ACC or the inverted number ACC_INV. The determined scan number x is then converted into the scan control signal S[x] to be output to the power switch circuit 510.

Based on the scan order determined by the control circuit 500, the control circuit 500 should output display data to the current driver circuit in a corresponding order. For example, if a lower pixel row R2 is scanned earlier than an upper pixel row R1, the control circuit 500 may output the display data for the pixels in row R2 prior to outputting the display data for the pixels in row R1. Alternatively, if the current driver circuit has a frame buffer, it may still receive the display data from the control circuit in a sequential order, but output the display data non-sequentially based on information of the scan order provided by the control circuit.

Please note that the present invention aims at providing a novel scan method to scan the pixel rows on a LED panel non-sequentially. Those skilled in the art may make modifications and alterations accordingly. For example, the above embodiments show the non-sequential scan operations by using 5 rows or 7 rows simply. In fact, a display panel usually has hundreds or thousands of rows of pixels, and the algorithm provided by the present invention is applicable to any number of pixel rows, where the accumulated number may be represented by any appropriate number of bits. In addition, the non-sequential scan method may be applied to the entire panel or partial panel.

In another embodiment, other algorithms for calculating the scan number may be feasible if the control circuit is ensured to scan each row once in one frame period. As long as the present scan number (i.e., the presently scanned row number) is calculated based on the previous accumulated number or previous scan number (i.e., the previously scanned row number) and the scan order does not follow a sequential top-down or bottom-up the order, related implementations should belong to the scope of the present invention. Further note that in the above embodiment, the scan method of the present invention is applied to a LED panel. In another embodiment, the scan method of the present invention may be applicable to any other type of display panel such as an organic LED (OLED) panel, liquid crystal display (LCD), or plasma display panel (PDP), but not limited thereto.

Please also note that the scan order may further be scrambled by applying a random number. In an embodiment, the scan order of a frame period may be started with a random number, which may be realized by starting to accumulate the accumulated number with a random number. The related algorithm with random start is shown in FIG. 6.

Figure 6:
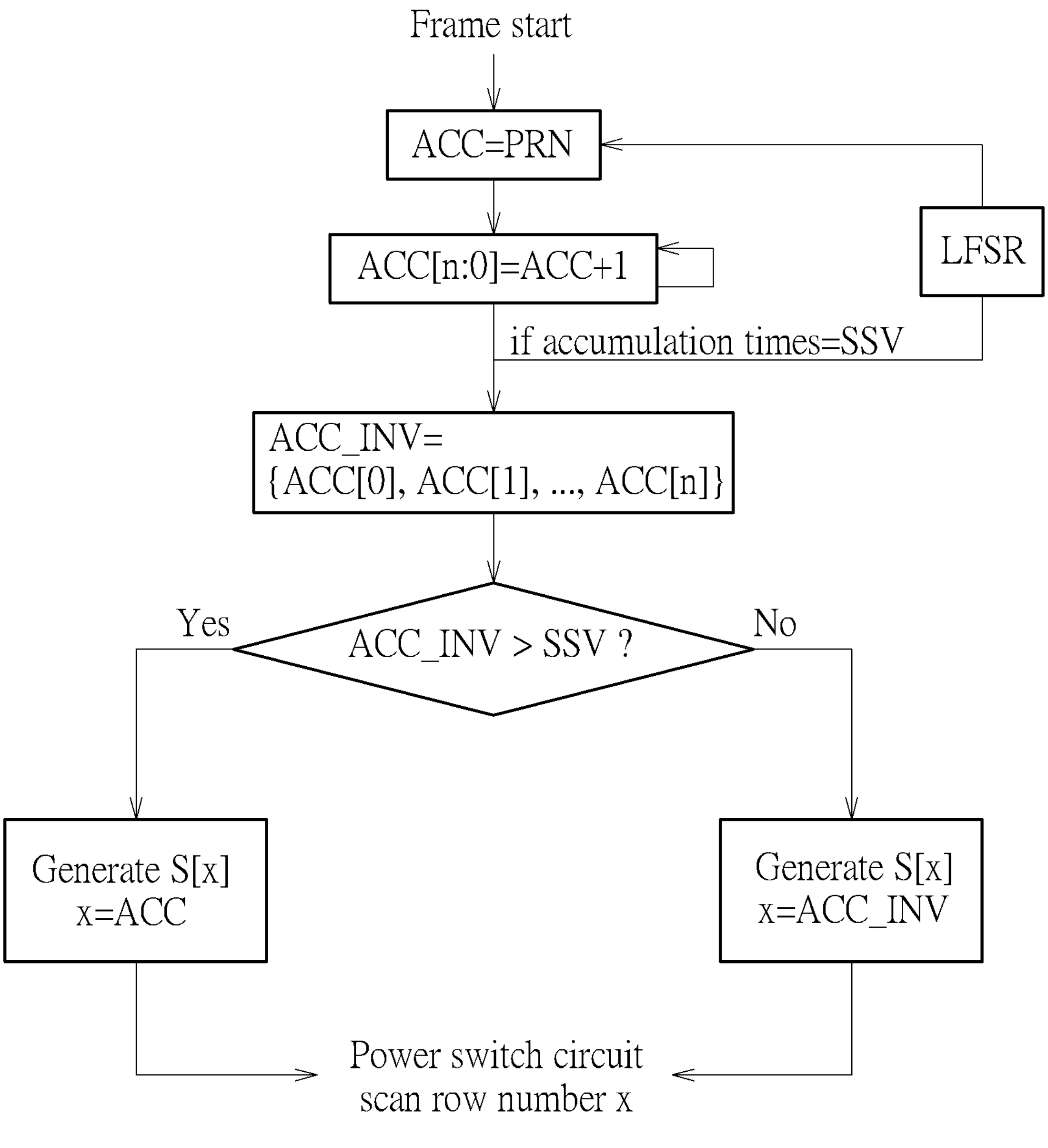
FIG. 6 is a flowchart of an algorithm for generating scan control signals for the power switch circuit with random start according to an embodiment of the present invention.

The algorithm shown in FIG. 6 is similar to the algorithm shown in FIG. 3, except that a linear feedback shift register (LFSR) is included and that the accumulated number ACC starts from a pseudo-random number PRN in response to a frame start signal. In this embodiment, the first scan number is determined according to the accumulated number ACC1 (or its inverted number), which may be a pseudo-random number PRN generated d from the LFSR. Subsequent accumulated numbers (i.e., ACC2, ACC3, ACC4 . . . ) are accumulated from the first accumulated number ACC1. This method allows the scan of each image frame to start from different rows, so as to improve the randomness of the scan operation. Further note that the scan operation of a frame period is completed if the accumulation times reach the scan setting value SSV.

Table 3 shows an embodiment of scan operations with random start in several frame periods. In this embodiment, the display panel includes 7 rows of pixels numbered from 1 to 7. The operations of three consecutive frame periods F1-F3 are listed in Table 3. Since the algorithm uses the same accumulation method with different start points, the scan orders for different frames follow a similar proceeding rule but start from different scan numbers.

TABLE 3

| Scan cycle | Scan No. in F1 | Scan No. in F2 | Scan No. in F3 |
|---|---|---|---|
| 1 | 2 | 1 | 3 |
| 2 | 6 | 5 | 7 |
| 3 | 1 | 3 | 4 |
| 4 | 5 | 7 | 2 |
| 5 | 3 | 4 | 6 |
| 6 | 7 | 2 | 1 |
| 7 | 4 | 6 | 5 |

According to the embodiments of the present invention, the control circuit for the power switch circuit may calculate the scan number in each scan cycle based on bit value calculations such as accumulation and bit inversion. A calculation logic included in the control circuit may serve this purpose. Therefore, the non-sequential scan order may be determined without receiving an external indication about which row is to be scanned. In other words, the scan order may be determined only based on pure calculations with the accumulated number and inverted number which are both generated internally, and there is no need to program the control circuit by using an external command to instruct a specific scan order.

Due to similar reasons, the non-sequential scan order may be determined without using an indication, which specifies the scan order or includes information for deriving the scan order, stored in a memory or register. Therefore, the control circuit may not need to be equipped with the memory or register for storing the indication about which row is to be scanned or storing the subsequently scanned numbers.

As can be seen, the non-sequential scan method provided by the present invention not only solves the problem of jelly effect in the video/image of shooting a LED screen, but also achieves the benefits of low reception bandwidths (due to the avoidance of external indication) and low circuit areas (due to the saving of memory space).

To sum up, the present invention provides a novel scan method to scan the pixel rows on a LED panel non-sequentially. In an embodiment, the control circuit for controlling the display panel may perform an algorithm for generating a series of scan numbers indicating the scan order. The scan numbers may be generated by a series of accumulating and inverting operations. With the non-sequential scan order, the problem of jelly effect may be solved. The non-sequential scan may be performed only based on internal calculations, where the reception of external indications of scan order and the usage of a memory or register for storing the scan order may be avoided. As a result, the non-sequential scan method of the present invention may achieve the benefits of low reception bandwidths and low circuit areas.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of scanning a display panel having a plurality of rows of pixels, the method comprising:

generating a first accumulated number;

reversing a bit order of the first accumulated number to generate a first inverted number, wherein a bit order of the first inverted number from a least significant bit to a most significant bit corresponds respectively to a most significant bit of the first accumulated number to a least significant bit of the first accumulated number in sequence;

selecting a first scan number from the first accumulated number or the first inverted number;

scanning a present row of pixels having the first scan number among the plurality of rows of pixels;

accumulating the first accumulated number to generate a second accumulated number;

reversing a bit order of the second accumulated number to generate a second inverted number;

selecting a second scan number from the second accumulated number or the second inverted number; and scanning a next row of pixels having the second scan number among the plurality of rows of pixels after scanning the present row of pixels;

wherein the plurality of rows of pixels are scanned in a scan order different from a numbering order of the plurality of rows of pixels.

2. The method of claim 1, wherein the plurality of rows of pixels are numbered in an ascending order from up to down.

3. The method of claim 1, wherein the step of accumulating the first accumulated number to generate the second accumulated number comprises:

adding the first accumulated number by 1 to generate the second accumulated number.

4. The method of claim 1, wherein the step of selecting the second scan number from the second accumulated number or the second inverted number comprises:

determining whether the second inverted number is greater than a scan setting value to generate a determination result; and selecting the second scan number from the second accumulated number or the second inverted number according to the determination result.

5. The method of claim 4, wherein the scan setting value is equal to a total row count of the plurality of rows of pixels.

6. The method of claim 1, wherein the step of selecting the second scan number from the second accumulated number or the second inverted number comprises:

determining whether the second inverted number is greater than a scan setting value;

restoring the second accumulated number to generate the second scan number when the second inverted number is determined to be greater than the scan setting value; and applying the second inverted number to generate the second scan number when the second inverted number is determined to be smaller than or equal to the scan setting value.

7. The method of claim 1, wherein a bit order of the second inverted number from a least significant bit to a most significant bit corresponds respectively to a most significant bit of the second accumulated number to a least significant bit of the second accumulated number in the bit order of the second accumulated number in sequence.

8. The method of claim 1, further comprising:

starting to accumulate a plurality of accumulated numbers with a random number.

9. The method of claim 1, wherein the plurality of rows of pixels are light-emitting diode (LED) pixels.

10. A display driver for scanning a display panel having a plurality of rows of pixels, the display driver comprising:

a control circuit, to:

generate a first accumulated number;

reverse a bit order of the first accumulated number to generate a first inverted number, wherein a bit order of the first inverted number from a least significant bit to a most significant bit corresponds respectively to a most significant bit of the first accumulated number to a least significant bit of the first accumulated number in sequence;

select a first scan number from the first accumulated number or the first inverted number;

accumulate the first accumulated number to generate a second accumulated number; and reverse a bit order of the second accumulated number to generate a second inverted number;

selecting a second scan number from the second accumulated number or the second inverted number; and a power switch circuit, to:

scan a present row of pixels having the first scan number among the plurality of rows of pixels; and scan a next row of pixels having the second scan number among the plurality of rows of pixels after the present row of pixels are scanned;

wherein the plurality of rows of pixels are scanned in a scan order different from a numbering order of the plurality of rows of pixels.

11. The display driver of claim 10, wherein the plurality of rows of pixels are numbered in an ascending order from up to down.

12. The display driver of claim 10, wherein the control circuit comprises:

an adder to add the first accumulated number by 1 to generate the second accumulated number.

13. The display driver of claim 9, wherein the control circuit further comprises a determination circuit, to:

determine whether the second inverted number is greater than a scan setting value to generate a determination result; and select the second scan number from the second accumulated number or the second inverted number according to the determination result.

14. The display driver of claim 13, wherein the scan setting value is equal to a total row count of the plurality of rows of pixels.

15. The display driver of claim 9, wherein the control circuit further comprises a determination circuit, to:

determine whether the second inverted number is greater than a scan setting value;

restore the second accumulated number to generate the second scan number when the second inverted number is determined to be greater than the scan setting value; and apply the second inverted number to generate the second scan number when the second inverted number is determined to be smaller than or equal to the scan setting value.

16. The display driver of claim 9, wherein a bit order of the second inverted number from a least significant bit to a most significant bit corresponds respectively to a most significant bit of the second accumulated number to a least significant bit of the second accumulated number in the bit order of the second accumulated number in sequence.

17. The display driver of claim 10, wherein a plurality of accumulated numbers start to be accumulated with a random number.

18. The display driver of claim 10, wherein the plurality of rows of pixels are light-emitting diode (LED) pixels.

* * * * *